United States Patent [19]

Rosauer et al.

[11] Patent Number: 5,768,380

[45] Date of Patent: Jun. 16, 1998

[54] METHOD FOR SENDING A COMMUNICATION UNIT PARAMETER TO A PLURALITY OF COMMUNICATION UNITS

[75] Inventors: Matthew M. Rosauer, Chicago; Paul A. Arnone, Lake In The Hills; Patrick F. Forman, Alsip, all of Ill.

[73] Assignee: Motorola, Inc., Schaumburg, Ill.

[21] Appl. No.: 534,354

[22] Filed: Sep. 27, 1995

[51] Int. Cl.⁶ ........................................... H04L 9/08
[52] U.S. Cl. ........................ 380/21; 380/2; 380/9; 380/49; 370/252
[58] Field of Search ..................... 380/2, 9, 21, 49, 380/59, 44, 46, 98, 50; 340/825.36, 825.37; 370/252, 253

[56] References Cited

U.S. PATENT DOCUMENTS

| | | |
|---|---|---|
| 5,146,497 | 9/1992 | Bright . |
| 5,301,232 | 4/1994 | Mulford . |
| 5,325,432 | 6/1994 | Gardeck et al. . |
| 5,442,703 | 8/1995 | Kim et al. ............................. 380/21 |
| 5,471,461 | 11/1995 | Engdahl et al. ...................... 370/252 |
| 5,646,606 | 7/1997 | Wilson et al. ..................... 340/825.37 |

Primary Examiner—Bernarr E. Gregory
Attorney, Agent, or Firm—Christopher P. Moreno

[57] ABSTRACT

In a wireless communication system (100), a communication unit parameter is sent to a plurality of communication units (105–108) during a first period of time using either a group update method or an individual update method (401). A first set of communication units that did not receive the communication unit parameter is determined (402) and, during a second period of time, the communication unit parameter is sent to the first set of communication units using only the individual update method (403). During the second period of time, the communication unit parameter is sent based on primary and/or secondary regions of operation for each communication unit and also upon detection of update opportunities. This process can be repeated for any number of communication unit parameters (404). Using this method, updates of communication unit parameters have a high likelihood of being successfully and efficiently performed.

17 Claims, 2 Drawing Sheets

METHOD FOR SENDING A COMMUNICATION UNIT PARAMETER TO A PLURALITY OF COMMUNICATION UNITS

FIELD OF THE INVENTION

The present invention relates generally to wireless communication systems and, in particular, to a method for sending a communication unit parameter to a plurality of communication units.

BACKGROUND OF THE INVENTION

Wireless communication systems are well-known. Such systems typically include a plurality of communication units that transceive wireless communication resources with each other and a fixed infrastructure. The fixed infrastructure typically comprises base stations/repeaters that also transceive the wireless communication resources. In some systems, such as a PRIVACY PLUS® system by Motorola, Inc., the base stations operate under the direction of a central controller that controls allocation of the wireless communication resources. Regardless, it is often the case that the communication units include various communication unit parameters used for their normal operation. An example of such a parameter is an encryption key, as known in the art, used for the encryption and decryption of digitally transmitted voice and data communications. Other communication unit parameters are known to require updates, such as inhibit/enable status.

As known in the art, such communication unit parameters need to be updated from time to time. An encryption key is a good example of a communication unit parameter that must be updated relatively frequently in order to maintain proper security levels. Various methods are typically used for updating communication unit parameters. Such methods include "manual" reprogramming and over-the-air rekeying (OTAR) (particularly related to the update of encryption keys). Another method for performing updates of communication unit parameters is discussed in U.S. patent application Ser. No. 08/534,605 entitled METHOD FOR UPDATING A COMMUNICATION UNIT PARAMETER IN A WIRELESS COMMUNICATION SYSTEM, assigned to Motorola, Inc. and having the same filing date as the instant application.

In current systems, particularly those incorporating encryption keys, updates of communication unit parameters are performed using manually scheduled updates. That is, an entity within the system, typically a system manager, has to determine when to send update messages to groups of communication units and individual communication units. This process must be repeated to update those communication units that, for a variety of reasons, may have missed the previous update messages. Furthermore, the process may need to be repeated if more than one independent communication unit parameter needs to be updated throughout the system. In a wireless communication system comprising hundreds, or perhaps thousands, of communication units, this becomes an onerous and potentially error-plagued task.

Therefore, a need exists for a method of updating communication unit parameters in a wireless communication system that allows such updates to be performed in a systematically scheduled manner such that updates have a high likelihood of being efficiently and successfully performed.

DESCRIPTION OF A PREFERRED EMBODIMENT

In general, the present invention provides a method, in a wireless communication system, for sending a communication unit parameter to a plurality of communication units. During a first period of time, the communication unit parameter is sent to the plurality of communication units using either a group update method or an individual update method. A first set of communication units that did not receive the communication unit parameter is determined. During a second period of time, the communication unit parameter is sent to the first set of communication units using only the individual update method.

In one embodiment of the present invention, during the second period of time, the communication unit parameter is sent based on primary and/or secondary regions of operation for each communication unit of the first set. Also during the second period of time, the communication unit parameter is sent upon detection of update opportunities.

In another embodiment of the present invention, a second communication unit parameter is sent to the plurality of communication units during a third and fourth period of time in a similar manner as during the first and second periods of time, respectively. The above-described method can be incorporated into a key management controller for the update of an encryption key and/or an encryption map index. Using this method, updates are efficiently performed in a systematic manner such that the updates have a high likelihood of being successfully performed.

Figure 1:
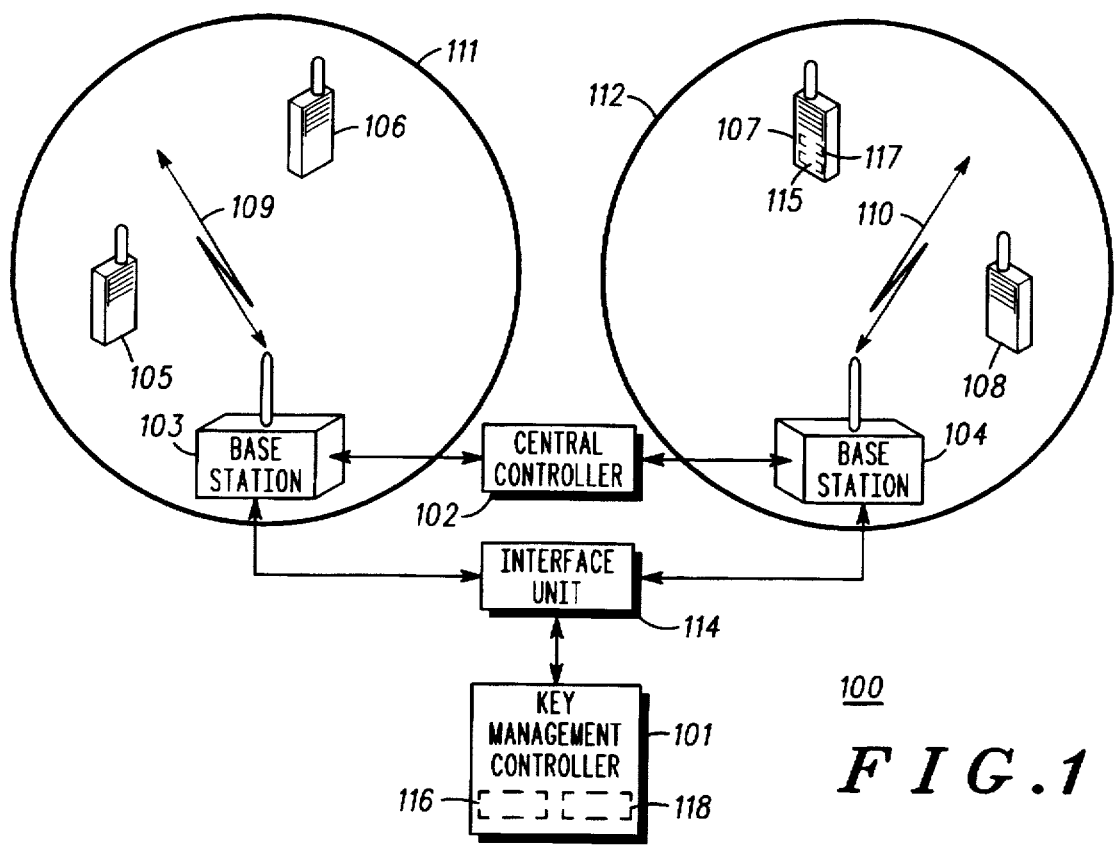
FIG. 1 is a block diagram of a wireless communication system that incorporates a key management controller.

The present invention can be more fully described with reference to FIGS. 1-5. FIG. 1 is a block diagram of a wireless communication system 100 that incorporates a key management controller 101. The wireless communication system 100 also comprises a central controller 102, base stations 103-104, a plurality of communication units 105-108, and wireless communication resources 109-110. In systems operating as trunked communication systems, the central controller 102 controls the allocation of the wireless communication resources 109-110. The wireless communication resources 109-110 may comprise radio frequency (RF) channels such as pairs of frequency carriers, time-division multiplexed (TDM) slots, or any other RF transmission media.

Each base station 103-104, which can be a QUANTAR™ base station by Motorola, Inc., in transceiving the wireless communication resources 109-110 with the communication units 105-108, establishes a corresponding coverage area 111-112. For the sake of clarity, two base stations are shown; in practice any number of base station can be used. In a preferred embodiment, the communication units 105-108 comprise in-hand portable units and/or in-car mobile units capable of encrypted two-way communications, such as ASTRO™ SPECTRA® radios by Motorola, Inc., and are capable of receiving commonly (i.e., group-wide) or individually addressed messages. Although shown in only one for simplicity, each communication unit 105-108 includes memory 115, such as random access memory (RAM) and/or read-only memory (ROM), and a processor 117, such as a microprocessor and/or digital signal processor.

The key management controller 101 communicates with the base stations 103–104 via one or more interface units 114 (only one shown). Suitable key management controllers and interface units are known in the art. The key management controller 101 includes memory 116 and a processor 118 that are, at a minimum, as functionally capable as the memory 115 and processor 117 used in the communication units 105–108. The memories 115–116 and processors 117–118 are used in accordance with well known programming techniques for the storage and execution of software algorithms. In a preferred embodiment, the key management controller 101 generates and stores at least one encryption key in accordance with known encryption techniques. Furthermore, the key management controller 101 generates an encryption map index, as described below.

Figure 2:
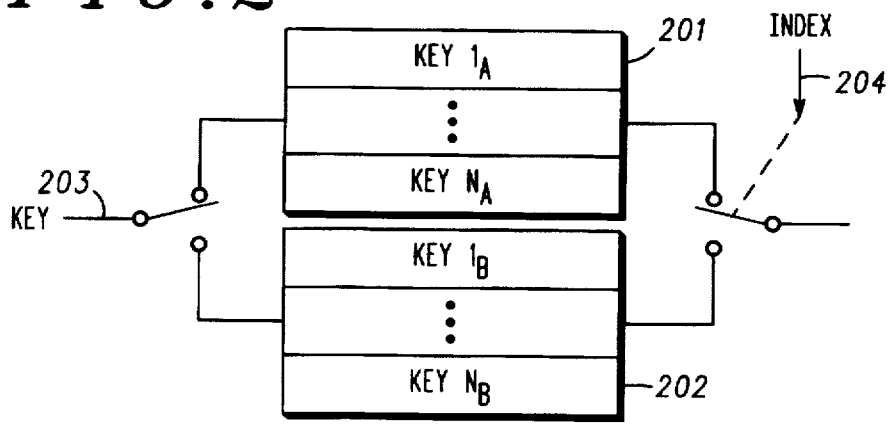
FIG. 2 is a block diagram illustrating storage and selection of encryption keys.

FIG. 2 is a block diagram illustrating storage and selection of encryption keys. The storage and selection shown is implemented using the memories 115 and processors 117 included in each of the communication units 105–108. As shown, a first encryption map 201 and a second encryption map 202 are provided, although any number of such encryption maps could be used. The first encryption map 201 includes a plurality of encryption keys labeled "KEY $i_A$" and the second encryption map 202 includes a plurality of encryption keys labeled "KEY $i_B$", where i=1 to N. As one or more updated encryption keys 203 are received via a group or individual update message, they are stored in either of the encryption maps 201–202. An encryption map index 204 is also received as a communication unit parameter used to indicate that encryption map from which encryption keys are to be selected for the encryption/decryption of voice and data communications. In this manner, keys can be updated without temporarily interrupting encrypted voice and data communications.

Figure 4:
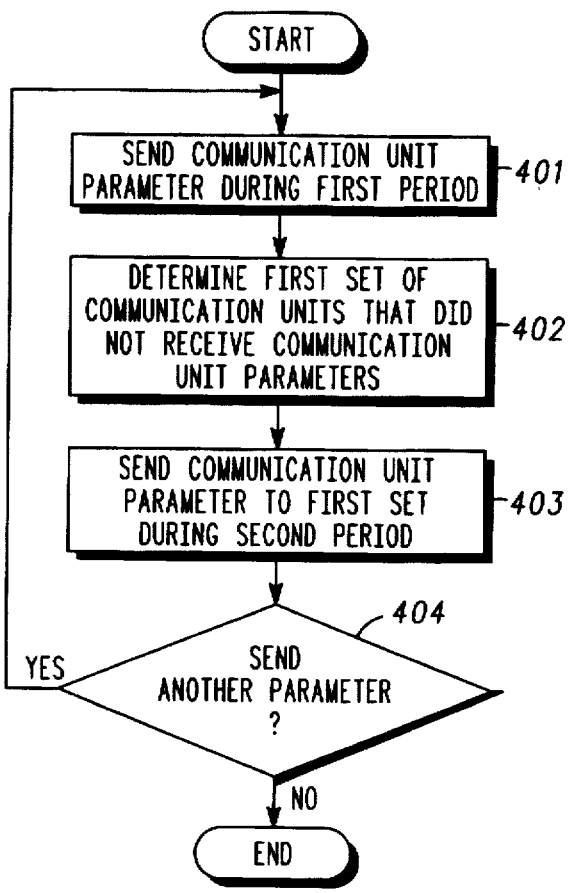
FIG. 4 is a flow chart illustrating an embodiment of the present invention.

FIG. 4 is a flow chart illustrating an embodiment of the present invention. The flowchart of FIG. 4 is preferably implemented using software algorithms stored and executed by the memory 116 and processor 118 of the key management controller 101. At step 401, the communication unit parameter (e.g., an encryption key) is sent to all communication units using either a group update method or an individual update method. A technique for selecting whether a group update method or an individual update method should be used to send the communication unit parameter is discussed in co-pending U.S. patent application Ser. No. 08/534,605 entitled METHOD FOR UPDATING A COMMUNICATION UNIT PARAMETER IN A WIRELESS COMMUNICATION SYSTEM assigned to Motorola, Inc. and having the same filing date as the instant application, the teachings of which are incorporated herein by reference.

Figure 3:
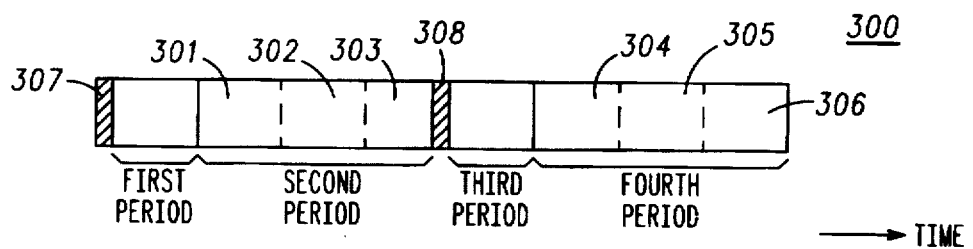
FIG. 3 illustrates an exemplary time line for the update of communication unit parameters.

The first period of time of step 401 is illustrated in FIG. 3. FIG. 3 illustrates an exemplary time line 300 for the update of communication unit parameters. In particular, the time line 300 illustrates the relationships between the first period of time, a second period of time, a third period of time, and a fourth period of time, as discussed in greater detail below. Furthermore, update periods 307–308 are also shown. Changes in communication unit parameters, e.g., creation of new encryption keys, occur during the update periods 307–308. The lengths of the first through fourth periods of time can vary as needed to perform the required updates. For example, each period of time could last only a few hours if the number of communication units to be updated is small (e.g., less than one hundred units); on the other hand, each period of time could last a day or more if the number of communication units to be updated is large (e.g., thousands of units up to a typical maximum of 10,000). In the case of an encrypted wireless communication system, the lengths of each period also reflect the level of security needed. That is, higher levels of security require more frequent encryption key updates occurring over shorter periods of time. In one embodiment, the minimum length for a period of time is 21 hours and the maximum length for a period of time is three months. Selection of the lengths of the periods of time is user-selectable and can be implemented, for example, as part of a graphical user interface (GUI) incorporated into a key management controller.

Referring again to FIG. 4, at step 402, a first set of communication units that did not receive the communication unit parameter during the first period of time is determined. In one embodiment, this determination occurs at the beginning of the second period of time. Techniques for determining those communication units that have not received the updated communication unit parameter are known in the art. For example, communication units that do not transmit an acknowledgment of receipt of the updated communication unit parameter are assumed to have not received the updated parameter.

Regardless of how the first set of communication units is determined, at step 403 the communication unit parameter is sent to the first set of communication units during the second period of time. During the second period of time only the individual update method is used to send the communication unit parameter. Further discussion regarding the second period of time (and the fourth period of time) is presented below with respect to FIGS. 3 and 5.

At step 404, it is determined if another (second) communication unit parameter (e.g., an encryption key index) needs to be sent. If so, a second iteration of the process continues at step 401. During the second iteration, however, the first and second periods of time are replaced by the third and fourth periods of time, respectively. That is, the second communication unit parameter is sent to the plurality of communication units using either the group or individual update method during the third period of time (i.e., step 401). A second set of communication units that did not receive the second communication unit parameter is determined (i.e., step 402), and the second communication unit parameter is sent to the second set of communication units, using only the individual update method, during the fourth period of time (i.e., step 403). In essence, the procedure for sending the second communication unit parameter is the same as that for sending the first; only the names used to describe the process are changed. As the procedure described above can be implemented by the key management controller 101 as a software algorithm, the process of performing updates of communication unit parameters can be automated so as to eliminate the need for user-defined scheduling and increase the likelihood of successful updates.

Figure 5:
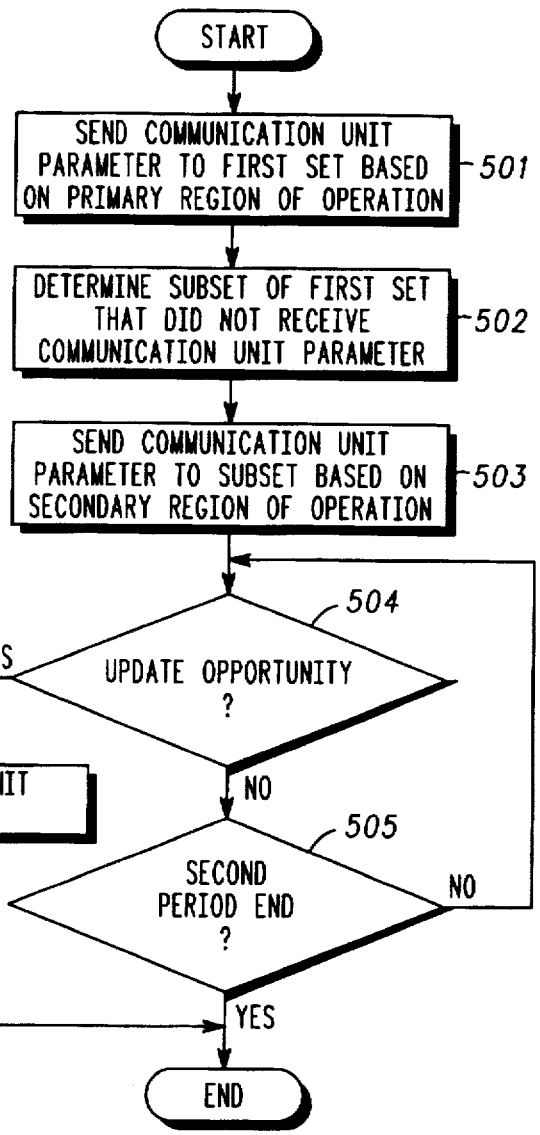
FIG. 5 is a flow chart illustrating in greater detail a step of the embodiment in FIG. 4.

As alluded to above, updates performed during the second period of time are discussed in further detail with respect to FIGS. 3 and 5. As shown in FIG. 3, the second period of time can be divided into subperiods 301–303 and, likewise, the fourth period of time can also be divided into subperiods 304–306. The length of each subperiod 301–306 can be user definable and will vary according the length of second and fourth periods of time.

Referring now to FIG. 5, at step 501 the communication unit parameter is sent to each communication unit of the first set of communication units during the first subperiod 301, using the individual update method, based on a primary region of operation for each communication unit. For the purposes of simplicity, FIG. 5 is described in terms of second period of time. It is understood that process described in FIG. 5 is equally applicable to the fourth period of time and its analogous components (i.e., the subperiods 304-306). In the context of the present invention, the primary region of operation for a communication unit comprises a coverage area where the communication unit is either last heard from or most likely to be currently operating.

At step 502, a subset of the first set of communication units is determined, wherein the subset comprises communication units that did not receive the communication unit parameter at step 501. At step 503, the communication unit parameter is sent to each communication unit of the subset during the second subperiod 302, using the individual update method, based on a secondary region of operation for each communication unit. A secondary region of operation for a communication unit comprises a coverage area in which the communication unit is next most likely, after the primary region of operation, to be currently operating. Methods for determining primary and secondary regions of operation are known in the art.

At step 505, during the third subperiod 303, it is determined if any update opportunities have occurred. While waiting for the occurrence of update opportunities, it is repetitively determined, at step 505, whether the second period of time (and, of course, the third subperiod 303) has ended. If not, processing continues at step 504. In the context of the present invention, an update opportunity is any system event that indicates that a communication unit is active and, therefore, that attempts to communicate with the communication unit are likely to be successful. For example, requests for the communication unit parameter or attempted communications are suitable update opportunities. If an update opportunity occurs, the communication unit parameter is sent, at step 506, to the communication unit responsible for the update opportunity, again using the individual update method. By sending the communication unit parameter to primary and secondary regions of operation and using update opportunities to also perform updates, the likelihood of all communication units being successfully updated is improved without placing an undue burden on system resources or an operator of the communication system.

Although the present invention has been described above with respect to encryption keys and an encryption map index as used by a key management controller, those of ordinary skill in the art will recognize that the present invention can be incorporated for use in any system that performs updates of one or more communication unit parameters. Furthermore, the number of time periods discussed above can be adjusted to accommodate any number of communication unit parameters without departing from the spirit of the present invention.

The present invention provides a method, in a wireless communication system, for sending a communication unit parameter to a plurality of communication units. The communication unit is sent during user-defined periods of time using a group update method and/or an individual update method. Furthermore, updates are directed towards primary and secondary regions of operation and triggered by update opportunities. This process can be implemented automatically and repeated for each communication unit parameter requiring an update. Consequently, the likelihood that all communication units will be successfully updated is increased while minimizing the burden placed on the system and a system operator.

We claim:

1. In a wireless communication system that includes a plurality of communication units, a method for sending a communication unit parameter to the plurality of communication units, the method comprising steps of:
   sending the communication unit parameter to the plurality of communication units during a first period of time, wherein the communication unit parameter is sent using one of either a group update method and an individual update method;
   determining a first set of communication units of the plurality of communication units that did not receive the communication unit parameter; and
   sending the communication unit parameter to the first set of communication units during a second period of time, wherein the communication unit parameter is sent using the individual update method.

2. The method of claim 1, the step of sending the communication unit parameter during the second period of time further comprising a step of:
   sending, to each communication unit of the first set of communication units, the communication unit parameter based on a primary region of operation for each communication unit of the first set of communication units.

3. The method of claim 2, the step of sending the communication unit parameter during the second period of time further comprising steps of:
   determining a subset of the first set of communication units that did not receive the communication unit parameter; and
   sending, to each communication unit of the subset of the first set, the communication unit parameter based on a secondary region of operation for each communication unit of the subset of the first set.

4. The method of claim 3, the step of sending the communication unit parameter during the second period of time further comprising steps of:
   determining the occurrence of an update opportunity corresponding to a communication unit of the plurality of communication units; and
   sending, to the communication unit, the communication unit parameter.

5. The method of claim 1, further comprising steps of:
   sending a second communication unit parameter to the plurality of communication units during a third period of time, wherein the second communication unit parameter is sent using one of either the group update method and the individual update method;
   determining a second set of communication units of the plurality of communication units that did not receive the second communication unit parameter; and
   sending the second communication unit parameter to the second set of communication units during a fourth period of time, wherein the second communication unit parameter is sent using the individual update method.

6. The method of claim 5, the step of sending the second communication unit parameter during the fourth period of time further comprising a step of:
   sending, to each communication unit of the second set of communication units, the second communication unit parameter based on a primary region of operation for each communication unit of the second set of communication units.

7. The method of claim 6, the step of sending the second communication unit parameter during the fourth period of time further comprising steps of:

determining a subset of the second set of communication units that did not receive the second communication unit parameter; and sending, to each communication unit of the subset of the second set, the second communication unit parameter based on a secondary region of operation for each communication unit of the subset of the second set.

8. The method of claim 7, the step of sending the communication unit parameter during the fourth period of time further comprising steps of:

determining the occurrence of an update opportunity corresponding to a communication unit of the plurality of communication units; and sending, to the communication unit, the second communication unit parameter.

9. The method of claim 5, wherein the communication unit parameter is at least one encryption key.

10. The method of claim 9, wherein the second communication unit parameter is an encryption map index.

11. In a key management controller that includes a processor, wherein the key management controller operates within a wireless communication system and controls encryption keys for a plurality of communication units within the wireless communication system, a method for sending encryption information to the plurality of communication units, the method comprising steps of:

sending, via the wireless communication system, at least one encryption key to the plurality of communication units during a first period of time, wherein the at least one encryption key is sent using one of either a group update method and an individual update method;

determining a first set of communication units of the plurality of communication units that did not receive the at least one encryption key;

sending, via the wireless communication system, the at least one encryption key to the first set of communication units during a second period of time, wherein the at least one encryption key is sent using the individual update method;

sending, via the wireless communication system, an encryption map index corresponding to the at least one encryption key to the plurality of communication units during a third period of time, wherein the encryption map index is sent using one of either the group update method and the individual update method;

determining a second set of communication units of the plurality of communication units that did not receive the encryption map index; and sending, via the wireless communication system, the encryption map index to the second set of communication units during a fourth period of time, wherein the encryption map index is sent using the individual update method.

12. The method of claim 11, the step of sending the at least one encryption key during the second period of time further comprising a step of:

sending, to each communication unit of the first set of communication units via the wireless communication system, the at least one encryption key based on a primary region of operation for each communication unit of the first set of communication units.

13. The method of claim 12, the step of sending the at least one encryption key during the second period of time further comprising steps of:

determining a subset of the first set of communication units that did not receive the at least one encryption key; and sending, to each communication unit of the subset of the first set via the wireless communication system, the at least one encryption key based on a secondary region of operation for each communication unit of the subset of the first set.

14. The method of claim 13, the step of sending the at least one encryption key during the second period of time further comprising steps of:

determining the occurrence of an update opportunity corresponding to a communication unit of the plurality of communication units; and sending, to the communication unit via the wireless communication system, the at least one encryption key.

15. The method of claim 14, the step of sending the encryption map index during the fourth period of time further comprising a step of:

sending, to each communication unit of the second set of communication units via the wireless communication system, the encryption map index based on a primary region of operation for each communication unit of the second set of communication units.

16. The method of claim 15, the step of sending the encryption map index during the fourth period of time further comprising steps of:

determining a subset of the second set of communication units that did not receive the encryption map index; and sending, to each communication unit of the subset of the second set via the wireless communication system, the encryption map index based on a secondary region of operation for each communication unit of the subset of the second set.

17. The method of claim 16, the step of sending the at least one encryption key during the fourth period of time further comprising steps of:

determining the occurrence of an update opportunity corresponding to a communication unit of the plurality of communication units; and sending, to the communication unit via the wireless communication system, the encryption map index.

* * * * *